United States Patent Office 3,072,713
Patented Jan. 8, 1963

3,072,713
N¹-SUBSTITUTED BENZOYL-N¹,N²-DI-ISO-
PROPYL HYDRAZIDES
Hugo Gutmann, Reinach, Basel-Land, Switzerland, assignor to Hoffmann-La Roche Inc., Nutley, N.J., a corporation of New Jersey
No Drawing. Filed Sept. 29, 1959, Ser. No. 843,040
Claims priority, application Switzerland Oct. 17, 1958
8 Claims. (Cl. 260—490)

This invention relates to N¹,N²-disubstituted acyl hydrazines. More particularly, the invention pertains to acyl hydrazines of the following formula (I)

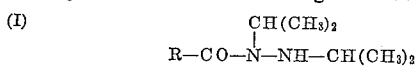

wherein R represents a phenyl group bearing one or more of the following substituents: halogen, nitro, hydroxy, lower alkyl, lower alkoxy, lower alkanoyloxy, lower alkylenedioxy, lower alkylidenedioxy or lower alkylmercapto, and acid addition salts thereof.

Illustrative of the phenyl substituents referred to above are the four halogens, chlorine, bromine, iodine and fluorine, of which chlorine is preferred, lower alkyl groups such as methyl, ethyl, propyl, isopropyl, butyl, isobutyl, t-butyl, amyl, hexyl, etc., lower alkoxy groups such as methoxy, ethoxy, propoxy, isopropoxy, butoxy, amyloxy, etc., lower alkanoyloxy groups wherein the acyl group is derived from lower alkanoic acids, e.g. acetoxy, propionoxy, butyroxy, etc., lower alkylenedioxy groups which form cyclic groups with two adjacent carbon atoms of the phenyl ring, e.g. methylenedioxy, ethylenedioxy, etc., lower alkylidenedioxy groups such as ethylidenedioxy, etc., and lower alkylmercapto groups such as methylmercapto, ethylmercapto, propylmercapto and the like. At least one of such substituents is attached to the phenyl group included in the symbol R of Formula I, but more than one group may be borne by the phenyl nucleus. Preferably one to three of the same substituent are attached.

Representative compounds of this invention include the following:

1-p-methylbenzoyl-1,2-diisopropylhydrazine,
1-p-isopropylbenzoyl-1,2-diisopropylhydrazine,
1-p-tert. butylbenzoyl-1,2-diisopropylhydrazine,
1-(3,4-dimethylbenzoyl)-1,2-diisopropylhydrazine,
1-(2,4,6-trimethylbenzoyl)-1,2-diisopropylhydrazine,
1-o-acetoxybenzoyl-1,2-diisopropylhydrazine,
1-m-acetoxybenzoyl-1,2-diisopropylhydrazine,
1-p-acetoxybenzoyl-1,2-diisopropylhydrazine,
1-(2,4-diacetoxybenzoyl)-1,2-diisopropylhydrazine,
1-(2,5-diacetoxybenzoyl)-1,2-diisopropylhydrazine,
1-(2-acetoxy-3-methylbenzoyl)-1,2-diisopropylhydrazine,
1-o-hydroxybenzoyl-1,2-diisopropylhydrazine,
1-m-hydroxybenzoyl-1,2-diisopropylhydrazine,
1-p-hydroxybenzoyl-1,2-diisopropylhydrazine,
1-(2,4-dihydroxybenzoyl)-1,2-diisopropylhydrazine,
1-(2,5-dihydroxybenzoyl)-1,2-diisopropylhydrazine,
1-(2-hydroxy-3-methylbenzoyl)-1,2-diisopropylhydrazine,
1-o-methoxybenzoyl-1,2-diisopropylhydrazine,
1-p-methoxybenzoyl-1,2-diisopropylhydrazine,
1-o-ethoxybenzoyl-1,2-diisopropylhydrazine,
1-p-ethoxybenzoyl-1,2-diisopropylhydrazine,
1-(3,4-dimethoxybenzoyl)-1,2-diisopropylhydrazine,
1-(3,4-methylenedioxybenzoyl)-1,2-diisopropylhydrazine,
1-(3,4-ethylenedioxybenzoyl)-1,2-diisopropylhydrazine,
1-(3,4,5-trimethoxybenzoyl)-1,2-diisopropylhydrazine,
1-(2-methoxy-3-methylbenzoyl)-1,2-diisopropylhydrazine,
1-(2-acetoxy-5-methoxybenzoyl)-1,2-diisopropylhydrazine,
1-(4-acetoxy-3-methoxybenzoyl)-1,2-diisopropylhydrazine,
1-(2-hydroxy-5-methoxybenzoyl)-1,2-diisopropylhydrazine,
1-(4-hydroxy-3-methoxybenzoyl)-1,2-diisopropylhydrazine,
1-p-methylmercaptobenzoyl-1,2-diisopropylhydrazine,
1-o-ethylmercaptobenzoyl-1,2-diisopropylhydrazine,
1-o-bromobenzoyl-1,2-diisopropylhydrazine,
1-m-bromobenzoyl-1,2-diisopropylhydrazine,
1-p-bromobenzoyl-1,2-diisopropylhydrazine,
1-o-chlorobenzoyl-1,2-diisopropylhydrazine,
1-m-chlorobenzoyl-1,2-diisopropylhydrazine,
1-p-chlorobenzoyl-1,2-diisopropylhydrazine,
1-p-nitrobenzoyl-1,2-diisopropylhydrazine,
1-(2,4-dichlorobenzoyl)-1,2-diisopropylhydrazine,
1-(3,4-dichlorobenzoyl)-1,2-diisopropylhydrazine,
1-(2,6-dichlorobenzoyl)-1,2-diisopropylhydrazine,
1-p-fluorobenzoyl-1,2-diisopropylhydrazine,
1-o-iodobenzoyl-1,2-diisopropylhydrazine,
1-(3-chloro-4-methylbenzoyl)-1,2-diisopropylhydrazine,
1-(2-acetoxy-5-chlorobenzoyl)-1,2-diisopropylhydrazine,
1-(2-hydroxy-5-chlorobenzoyl)-1,2-diisopropylhydrazine,
1-(3-chloro-4-methoxybenzoyl)-1,2-diisopropylhydrazine,
1-(2-chloro-5-nitrobenzoyl)-1,2-diisopropylhydrazine.

A preferred group of compounds within the class defined by Formula I are those wherein R represents halophenyl, lower alkylphenyl or lower alkoxyphenyl, there being one to three of the designated substituents on the phenyl ring.

The N¹,N²-diisopropylhydrazine derivatives of this invention are produced by condensing 1,2-diisopropylhydrazine or a salt thereof with an acylating agent including the group R—CO—, wherein R has the same meaning as above. In the case of hydroxy-substituted phenyl groups, it is preferable to derive such compounds by saponification of the corresponding alkanoyloxyphenyl compound.

Acylating agents useful for the condensation reaction with 1,2-diisopropylhydrazine or its salts are acid halogenides, especially acid chlorides or acid anhydrides. For this reaction, symmetrical acid anhydrides derived from two molecules of an organic acid having the formula R—COOH, wherein R is the same as above, or mixed anhydrides wherein one R—CO— group is derived from an acid as above and the other group is derived from a lower alkanoic acid or a carboxylic acid monoester may be used. Approximately equimolar proportions of 1,2-diisopropylhydrazine or salt and the acylating agent are used. When 1,2-diisopropylhydrazine itself is used, an excess may be present with advantageous results. The reaction is preferably effected in an inert solvent such as benzene in the presence of a tertiary base such as pyridine or triethylamine when an acyl halide is one of the reactants.

The compounds of Formula I are basic substances and form acid addition salts by reaction with inorganic or organic acids. Illustrative salts formed by these compounds are hydrohalides, such as hydrochloride, hydrobromide, etc., other mineral acid salts such as phosphate, sulfate, nitrate and the like, tartrate, salicylate, ascorbate, acetate, oxalate, benzenesulfonate, etc.

The compounds of this invention are monoamine oxidase inhibitors which effect the deactivation of physiological regulators such as serotonin, epinephrine, tryptamine, etc. and result in stimulation of the central nervous system. They are useful as psychotherapeutic agents for relief of disturbed or depressed states. They are also useful in overcoming cachexia. They may be administered orally or parenterally in the form of tablets, capsules, injectables and the like by incorporating therapeutic dosages of the free base or a medicinally acceptable acid addition salt thereof in a conventional solid or liquid vehicle.

The following examples are illustrative of the invention, but not limitative thereof. Temperatures are given on the centigrade scale.

Example 1

A solution of 18.3 g. of p-isopropylbenzoyl chloride in 100 ml. of absolute benzene were dropped into a solution of 32 g. of 1,2-diisopropylhydrazine in 150 ml. of absolute benzene with stirring. 1,2-diisopropylhydrazine hydrochloride precipitated. The mixture was boiled under reflux for one hour, cooled, filtered and the filtrate was concentrated in vacuo. The residue was distilled in vacuo to obtain 1-p-isopropylbenzoyl-1,2-diisopropylhydrazine, B.P. 112–114°/0.07 mm.

By using 18.3 g. of 2,4,6-trimethylbenzoyl chloride instead of p-isopropylbenzoyl chloride in the procedure described above, there was obtained in the same manner 1-(2,4,6-trimethylbenzoyl)-1,2-diisopropylhydrazine as a colorless oil boiling at 110–111°/0.01 mm. By treating a solution of this compound in ether with alcoholic hydrogen chloride, 1-(2,4,6-trimethylbenzoyl)-1,2-diisopropylhydrazine hydrochloride precipitated. This product melted at 121–122° after recrystallization from alcohol-ether.

Example 2

A solution of 15.5 g. of p-toluoyl chloride in 100 ml. of absolute benzene was dropped into a solution of 25.5 g. 1,2-diisopropylhydrazine in 300 ml. of absolute benzene over a period of two hours at room temperature with stirring. 1,2-diisopropylhydrazine hydrochloride precipitated. The mixture was stirred for an additional four hours at 40°, cooled and filtered. The filtrate was washed with water and with saturated sodium bicarbonate solution, dried over sodium sulfate and concentrated in vacuo. The residue was distilled in vacuo to obtain 1-p-toluoyl-1,2-diisopropylhydrazine, B.P. 76–77°/0.04 mm. The distillate, upon standing, resolidified to a crystalline mass, M.P. 41–42°. 1-p-toluoyl-1,2-diisopropylhydrazine hydrochloride, M.P. 163–164°, was formed according to the procedure described in Example 1.

By substituting 19.5 of p-tert. butylbenzoyl chloride for the p-toluoyl chloride in the procedure described in the preceding paragraph, there was obtained in the same manner 1-p-tert. butylbenzoyl-1,2,-diisopropylhydrazine, B.P. 98–100°/0.03 mm. 1-p-tert. butylbenzoyl-1,2-diisopropylhydrazine hydrochloride, M.P. 165–166°, was similarly obtained.

By substituting 17 g. of p-anisoyl chloride for the p-toluoyl chloride in the procedure described in the first paragraph of this example, there was obtained by the same procedure 1-p-anisoyl-1,2-diisopropylhydrazine, B.P. 95–96°/0.01 mm. 1-p-anisoyl-1,2-diisopropylhydrazine hydrochloride, M.P. 165–166° (with dec.), was similarly obtained.

Example 3

A solution of 23 g. 3,4,5-trimethoxybenzoyl chloride in 100 ml. of absolute benzene was dropped into a solution of 25.5 g. of 1,2-diisopropylhydrazine in 300 ml. of absolute benzene over a period of two hours at room temperature with stirring. 1,2-diisopropylhydrazine hydrochloride precipitated. The mixture was stirred for an additional four hours at 40°, cooled and filtered. The filtrate was washed with water and with saturated sodium bicarbonate solution and dried over sodium sulfate. This was then evaporated to dryness in vacuo and the residue was crystallized from petroleum ether to obtain 1-(3,4,5-trimethoxybenzoyl)-1,2-diisopropylhydrazine as colorless prisms, M.P. 63–64°.

Example 4

A solution of 20 g. of o-acetoxybenzoyl chloride in 100 ml. of absolute benzene was dropped into a solution of 25.5 g. of 1,2-diisopropylhydrazine in 300 ml. of absolute benzene at room temperature with stirring over a period of two hours, whereupon 1,2-diisopropylhydrazine hydrochloride precipitated. The mixture was stirred for an additional four hours at 40°, cooled and filtered. The filtrate was washed with water and with saturated sodium bicarbonate solution, dried over sodium sulfate and concentrated in vacuo. The residue was distilled in vacuo to obtain 1-(o-acetoxybenzoyl)-1,2-diisopropylhydrazine, B.P. 95–97°/0.01 mm.

25 g. of 1-(o-acetoxybenzoyl)-1,2-diisopropylhydrazine were dissolved in 250 ml. of 3 N sodium hydroxide by agitating at 50° and then immediately cooled. Upon acidifying with concentrated hydrochloric acid, a resin precipitated which crystallized upon grinding. The mixture was filtered under suction. The residue remaining on the filter was washed with water, dried and recrystallized from petroleum ether. The 1-salicoyl-1,2-diisopropylhydrazine melted at 93–94°.

Eample 5

A solution of 52.4 g. of p-chlorobenzoyl chloride in 100 ml. of absolute benzene was was dropped into a solution of 76.5 g. of 1,2-diisopropylhydrazine in 1.5 l. of absolute benzene over a period of four hours with stirring at room temperature, whereupon 1,2-diisopropylhydrazine hydrochloride precipitated. The mixture was stirred for an additional four hours at 40° and then cooled to room temperature. The colorless benzene solution was filtered, the filtrate was washed with water, dried over sodium sulfate and then evaporated to dryness in vacuo. The solid residue, 1-p-chlorobenzoyl-1,2-diisopropylhydrazine, was crystallized from ethanol-water (4:3), M.P. 66–67°.

Example 6

29.5 g. of p-chlorobenzoic acid anhydride were suspended in 200 ml. of absolute benzene. 25.5 g. of 1,2-diisopropylhydrazine were added at 50–60°, whereupon everything went into solution. After all of the 1,2-diisopropylhydrazine had been added, the temperature was maintained at 50–60° for one hour and then the reaction mixture was permitted to cool overnight. The reaction mixture was partitioned between ether and water and permitted to stratify. The ether layer was separated, washed with water and with saturated sodium bicarbonate solution and dried over sodium sulfate. It was then evaporated to dryness in vacuo. The residue soon solidified in a crystalline mass. After recrystallization from petroleum ether, the 1-p-chlorobenzoyl-1,2-diisopropylhydrazine melted at 66–67°.

Example 7

A solution of 10.4 g. of 2,6-dichlorobenzoyl chloride in 50 ml. of absolute benzene was added dropwise to a solution of 12 g. of 1,2-diisopropylhydrazine in 300 ml. of absolute benzene at room temperature with stirring, whereupon diispropylhydrazine hydrochloride immediately began to precipitate. The mixture was stirred for an additional two hours, permitted to stand for several hours and then the precipitate was filtered off under suction. The filtrate was washed with water, dried over sodium sulfate and then the benzene solution was evaporated to dryness in vacuo. The oily residue soon solidified and was purified by dissolving in methanol and precipitating by the addition of water. The 1-(2,6-dichlorobenzoyl)-1,2-diisopropylhydrazine thus obtained melted at 73–75°.

By substituting 2,4-dichlorobenzoyl chloride for the 2,6-dichlorobenzoyl chloride in the procedure described in the preceding paragraph, there was obtained, after concentration of the benzene solution, 1-(2,4-dichlorobenzoyl)-1,2-diisopropylhydrazine as an oil which was purified by distillation, B.P. 120°/0.05 mm.

Example 8

A solution of 20 g. of veratric acid chloride in 200 ml.

of absolute benzene was added dropwise over a period of four hours to a solution of 25.5 g. of 1,2-diisopropylhydrazine in 300 ml. of absolute benzene at room temperature with stirring, whereupon 1,2-diisopropylhydrazine hydrochloride precipitated. The mixture was stirred for an additional four hours at 40° and then cooled. The reaction mixture was filtered, the filtrate was washed with water and with saturated sodium bicarbonate solution, then dried over sodium sulfate. It was then evaporated to dryness in vacuo and the solid residue was crystallized from petroleum ether. The 1-veratroyl-1,2-diisopropylhydrazine melted at 92.5–93.5°.

*Example 9*

A solution of 18.5 g. of p-nitrobenzoyl chloride in 100 ml. of absolute benzene was added dropwise over a period of two hours to a solution of 25.5 g. of 1,2-diisopropylhydrazine in 300 ml. of absolute benzene with stirring, whereupon 1,2-diisopropylhydrazine hydrochloride precipitated. The mixture was stirred for an additional four hours at 40° and then cooled. The reaction mixture was filtered, the filtrate was washed with water and with saturated sodium bicarbonate solution, then dried over sodium sulfate. It was then evaporated to dryness in vacuo and the solid residue was recrystallized from petroleum ether. The 1-p-nitrobenzoyl-1,2-diisopropylhydrazine melted at 85–87°.

I claim:

1. A compound selected from the group consisting of bases represented by the formula

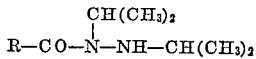

wherein R represents a phenyl group selected from the group consisting of mono-, di- and tri-substituted phenyl wherein the substituents are selected from the group consisting of halogen, nitro, hydroxy, lower alkoxy, lower alkanoyloxy, and lower alkylmercapto, and medicinally acceptable acid addition salts thereof.

2. 1-p-chlorobenzoyl-1,2-diisopropylhydrazine.
3. 1-(2,4-dichlorobenzoyl)-1,2-diisopropylhydrazine.
4. 1-p-anisoyl-1,2-diisopropylhydrazine.
5. 1-veratroyl-1,2-diisopropylhydrazine.
6. 1-(o-acetoxybenzoyl)-1,2-diisopropylhydrazine.
7. 1-salicoyl-1,2-diisopropylhydrazine.
8. 1-p-nitrobenzoyl-1,2-diisopropylhydrazine.

References Cited in the file of this patent

UNITED STATES PATENTS

| | | |
|---|---|---|
| 2,808,416 | Bell et al. | Oct. 1, 1957 |
| 2,999,880 | Wheatley et al. | Sept. 12, 1961 |

FOREIGN PATENTS

| | | |
|---|---|---|
| 782,420 | Great Britain | Sept. 4, 1957 |

OTHER REFERENCES

Beilstein: Handbuch der Organischen Chemie, vol. 9, 2nd supp., p. 214 (1949).

Beilstein: Handbuch der Organischen Chemie, vol. 9, pp. 351, 354 (1926); vol. 10 (2nd supp.), p. 160 (1949); vol. 4 (2nd supp.), p. 960 (1942).

Gale et al.: Journal American Chemical Society, vol. 75, pp. 1933–1942, page 1933 relied on (1953).